United States Patent [19]

Kohtani

[11] 3,710,036

[45] Jan. 9, 1973

[54] ANTI-CROSSTALK SYSTEM FOR MULTI-TRACK MULTIPLE HEAD DEVICE WITH LONGITUDINALLY SPACED HEAD MEANS, SHIELDING CASES FOR EACH HEAD MEANS, AND AN ERASE HEAD PLACED BETWEEN EACH HEAD MEANS

[75] Inventor: Yutaka Kohtani, Tokyo, Japan

[73] Assignee: Canon Kabushiki Kaisha, Tokyo, Japan

[22] Filed: Oct. 20, 1970

[21] Appl. No.: 82,434

[30] Foreign Application Priority Data

Oct. 25, 1969 Japan ..............................44/101005

[52] U.S. Cl....................179/100.2 K, 179/100.2 MD

[51] Int. Cl............................G11b 5/10, G11b 23/18

[58] Field of Search.............179/100.2 K, 100.2 MD; 35/35 C

[56] References Cited

UNITED STATES PATENTS 3,495,337 2/1970 Meyer.......................179/100.2 MD 3,042,753 7/1962 Iwamura.......................179/100.2 C

*Primary Examiner*—Bernard Konick

*Assistant Examiner*—Robert S. Tupper

*Attorney*—Ward, McElhannon, Brooks & Fitzpatrick

[57] ABSTRACT

The magnetic head arrangement of this invention includes a first magnetic head, an erase head, a second magnetic head, a first shielding case to house the first magnetic head and a second shielding case to house the erase head and the second magnetic head. The first recording head faces a first track on a magnetic tape and has the function of reproducing the information stored on that first track. The second magnetic head functions as the recording head and, together with the erase head, faces a second recording track at a position spaced from the first magnetic head with respect to the running direction of the tape. Within the second shielding case the second magnetic head is disposed behind the erase head with respect to the direction of advancing movement of the tape.

3 Claims, 3 Drawing Figures

ANTI-CROSSTALK SYSTEM FOR MULTI-TRACK MULTIPLE HEAD DEVICE WITH LONGITUDINALLY SPACED HEAD MEANS, SHIELDING CASES FOR EACH HEAD MEANS, AND AN ERASE HEAD PLACED BETWEEN EACH HEAD MEANS

FIELD OF THE INVENTION

This invention relates to a magnetic head arrangement system and more particularly to a magnetic head arrangement system wherein the crosstalk between tracks is reduced.

DESCRIPTION OF THE PRIOR ART

It has become customary to use magnetic recording and play-back or reproducing equipment in the study of a foreign language. In this case, the method in common use is to reproduce on a teaching tape called the master tape the teaching material constituting signals corresponding to the teacher's voice recorded in advance, and to record the voice of the learner imitating the teaching material on a track other than the one on which the teaching material has been recorded, and then, after rewinding the tape, to reproduce both the recorded teaching material and the learner's voice simultaneously or only the learner's voice alone.

However when the track which records the teaching material is adjacent to the track which records the learner's voice, there is a fear that, when recording the learner's voice, the signal may leak to the track which records the teaching material, thus the teaching material itself may be contaminated by the leakage flux, so that the important teaching tape may be wasted.

Especially in a head arranged in such a way that the magnetic head for reproducing the material and the magnetic head for recording the learner's voice are accommodated in the same case, the leakage flux from the recording magnetic head reaches the reproducing head adjacent to said head, resulting in the occurrence of the crosstalk phenomenon. This causes the noise to mingle in the teaching material and the teaching tape to become very hard to listen to. Moreover, in the case where recording is carried out by using a microphone, etc., when crosstalk from another recording track has mingled in the reproducing track, the crosstalk will be reproduced and amplified by the reproducing track and recorded by the microphone again followed by crosstalk, resulting in the generation of howling and in bringing the teaching tape into an unserviceable condition.

In order to remove such defects, structure has been provided wherein a magnetism shielding plate is placed in between the reproducing magnetic head and the recording magnetic head.

However, this method has the defect that it fails to reduce completely the leakage flux between both heads, and on the contrary, while using the teaching tape repeatedly, the crosstalk between the teaching material reproducing track and the recording track accumulates and contaminates the teaching tape. Also, the above-mentioned construction of the magnetic recording and reproducing equipment has been limited to ones used for learning apparatus. However, the problematic points mentioned in the foregoing description appear also in other types of apparatus where the reproducing track is adjacent to the recording track and where these two tracks are operated simultaneously in the reproducing mode and recording mode, respectively.

SUMMARY OF THE INVENTION

An object of this invention is to remove the crosstalk produced between both tracks when the reproducing track which operates in the reproducing mode and the recording track which operates in the recording mode are formed simultaneously on the same magnetic recording medium.

A further object of this invention is to remove the crosstalk produced between both tracks when the reproducing track which operates in the reproducing mode, and the recording track which operates in the recording mode and is disposed closely adjacent to the reproducing track, operate simultaneously.

Another object of this invention is to offer a magnetic head arrangement system wherein a recording track which operates in the recording mode is formed on a magnetic recording medium next to a record track which records particular information, wherein the crosstalk produced between the record track and the recording track is removed.

A still further object of this invention is to offer a magnetic head arrangement system of very simple construction wherein the record track that records particular information and the recording track are formed on a magnetic recording medium and the crosstalk between both tracks is removed.

DESCRIPTION OF THE PREFERRED EMBODIMENT

Figure 1:
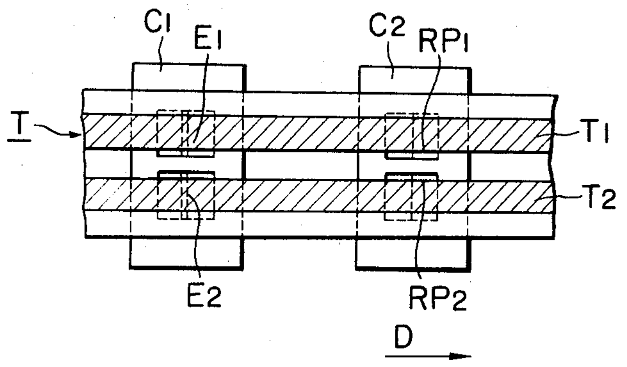
FIG. 1 shows the head arrangement of a conventional magnetic head arrangement system.

FIG. 1 shows the head arrangement when a conventional magnetic head is applied to a learning magnetic recording and reproducing apparatus. Reference numeral T is a teaching tape, $T_1$ and $T_2$ are tracks established on the tape T, $E_1$ is an erase head installed to face the track $T_1$, $E_2$ is an erase head for the track $T_2$, $C_1$ is a shielding case in which the heads $E_1$ and $E_2$ are assembled, $RP_1$ is a recording and reproducing magnetic head installed to face the track $T_1$, $RP_2$ is that for track $T_2$, and $C_2$ is a shielding case in which the aforementioned heads $RP_1$ and $RP_2$ are assembled.

The shielding case $C_2$ is mounted behind or downstream of the shielding case $C_1$ along in the running direction D of the tape.

The erase head $E_1$ which is installed to face the track $T_1$ that records and reproduces the content of the master tape and the erase head $E_2$ which is installed to face the track $T_2$ that allows the learner to record and reproduce his own voice are assembled into one shielding case $C_1$, and the recording and reproducing head $RP_1$ installed to face the track $T_1$ and recording and play-back head $RP_2$ installed to face the track $T_2$ are assembled into another shielding case $C_2$.

In the conventional arrangement mentioned so far, when the learner records his own voice on the track $T_2$ while listening to the content of teaching material recorded on the track $T_1$ of the teaching tape, since the heads $RP_1$ and $RP_2$ are assembled in one shielding case $C_2$, the recording signal supplied to the head $RP_2$ leaks to the head $RP_1$ as leakage flux, and the head $RP_1$ detected the signal to be supplied to the head $RP_2$ as well as the signal that was inherently reproduced by it. As a result, the voice of the learner (especially the high tone portion) is mingled with the voice of the teaching material reproduced, and the correct voice of the teaching material becomes hard to listen to. Also, when a loudspeaker is used in reproducing, the howling phenomenon is produced.

Figure 2:
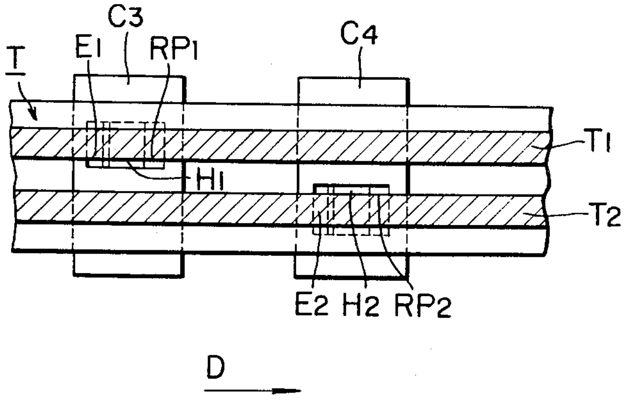
FIG. 2 shows an embodiment of a magnetic head arrangement according to this invention.

This invention is to remove such defects by employing the magnetic head arrangement shown in the embodiment illustrated in FIG. 2.

The feature of this invention is to offer a magnetic head arrangement system which is similar to the conventional magnetic head arrangement in that it has the same number of heads and occupies the same amount of space, but which completely eliminates the crosstalk between the first magnetic head and the second magnetic head. The magnetic head system of this invention is formed by mounting a first magnetic head to face a first recording track that records particular information on a magnetic recording medium such as a magnetic tape, wherein the first head has the function of reproducing the information stored on said track. An erase head and a second magnetic head are mounted to face a second recording track on the tape for recording desired material separately from the above-mentioned first track, and the second head is placed behind the erase head with respect to the advancing direction of the recording medium. In other words, the second head is disposed "downstream" of the erase head with respect to the advancing tape. The above-mentioned first magnetic head is encompassed in a first shielding case, and the compound head consisting of the erase head and the second magnetic head is encompassed in a second shielding case mounted in a spaced relation with respect to said first case along the running direction of the tape. In FIG. 2, T is a magnetic tape, $T_1$ is a track on which particular information such as a teaching material has been recorded, $T_2$ is a recording track for recording the voice of the learner, etc., $C_3$ is a shielding case in which a compound head $H_1$ having an erase head $E_1$ and a record/playback head $RP_1$ is assembled to face the track $T_1$; $C_4$ is a shielding case in which a compound head $H_2$ being arranged behind $C_3$ in the running direction of the tape T and having an erase head $E_2$ and record/playback head $RP_2$ is assembled. Thus, both of the heads $RP_1$ and $RP_2$ are capable of recording and playing back the tape signals.

In the aforementioned construction, when a recording on the track $T_2$ is made by applying the desired recording signal to the recording and reproducing head $RP_2$ while reproducing information recorded on the track $T_1$, for example the teaching material, since the heads $RP_1$ and $RP_2$ are arranged apart from each other in the running direction of the tape T, the leakage flux from the recording and reproducing head $RP_2$ hardly leaks to the track $T_1$ and, by operating the erase head $E_2$ in the compound head $H_2$ at the time of recording, track $T_2$ is erased prior to the operation of recording and reproducing head $RP_2$ of the track $T_2$, and then the desired information is recorded on the track $T_2$ by the operation of the recording and reproducing head $RP_2$.

By these means, the track $T_1$ is prevented from being influenced by the leakage flux caused by the recording and reproducing head $RP_2$.

Not only in the above-mentioned case where the recording and reproducing head $RP_1$ facing the track $T_1$ is used as the reproducing head but also the case where the said head is used as the recording head the mingling of the leakage flux from the head $RP_2$ into the information recorded on the track $T_1$ by the head $RP_1$ is avoided.

Figure 3:
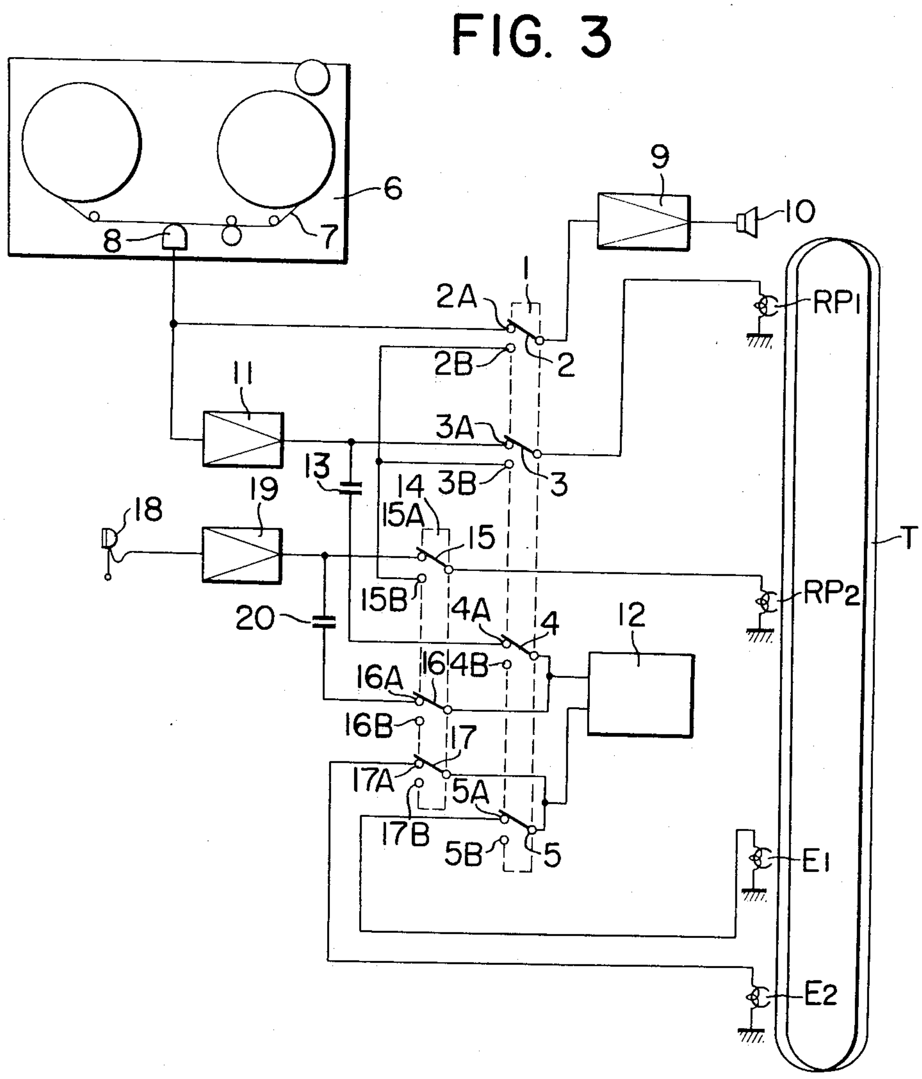
FIG. 3 shows the electric circuit diagram of a learning magnetic recording and reproducing apparatus to which the magnetic head arrangement system according to this invention is applied.

FIG. 3 shows an embodiment of magnetic recording and reproducing learning equipment which employs the magnetic head arrangement described with respect to FIG. 2. In FIG. 3, $E_1$, $RP_1$ and $E_2$, $RP_2$ are erase heads and recording and play-back heads accommodated respectively in the shielding cases $C_3$ and $C_4$ shown in FIG. 2.

Each head is installed to face the first and second tracks $T_1$ and $T_2$ of an endless type magnetic tape T. Since their arrangement is the same as that shown in FIG. 2, its description is omitted.

The heads $E_1$, $RP_1$, $E_2$, and $RP_2$ are connected to the selector switch 1, respectively. The selector switch 1 is switched in an interlocking manner with the reproducing operation of the tape, on which the teaching material is recorded, by control elements which are not shown in the drawing but are operated by the learner. The switch 1 is used to transcribe the teaching material to the magnetic tape T and it has movable contacts 2, 3, 4, 5 and fixed contacts, 2A, 2B, 3A, 3B, 4A, 4B and 5A, 5B. A tape recorder 6 provides a teaching tape 7 which has the teaching material recorded thereon, for example a foreign language. The tape is run by a constant drive mechanism not shown in the drawing and is reproduced by the reproducing head 8. The output is applied to the fixed terminal 2A of the selector switch 1, and 9 is a reproducing amplifier whose input is connected to the movable contact 2, and 10 is a loudspeaker connected to the output of the amplifier; 11 is a recording amplifier whose input is connected to the reproducing head 8 output, and its output end is connected to the fixed contact 3A of the selector switch 1 and, at the same time, its output is applied to the magnetic head $RP_1$ by way of the movable contact 3. An oscillation circuit 12 is to generate high-frequency bias current and erasing current. Its output is used to superimpose high-frequency bias current onto the output of the recording amplifier 11, and at the same time, to apply an erase current to the erase head $E_1$ installed to face the first track $T_1$ of the endless type T respectively, by way of the contacts 4, 4A, condenser 13 and contacts 5, 5A.

Reference numeral 14 is a remote control switch operated by the learner. The movable contacts 15, 16 and 17 are changed over by the operation of said switch 14, and 15A, 15B, 16A, 16B, 17A, 17B are the change-over fixed contacts that correspond to the movable contacts 15, 16, 17, respectively; 18 is a microphone and 19 is a recording amplifier whose output is applied to the recording reproducing head $RP_2$ by way of the contact 15 and 15A. The output terminals of the oscillation circuit 12 are connected in such a way as to apply the bias current to the output of the recording amplifier circuit 19 and the erase current to the erase head $E_2$ by way of the change-over contacts 16, 16A, the condenser 20, and the change-over contacts 17, 17A, respectively.

The operation of the magnetic recording and reproducing equipment having the constitution mentioned so far will be explained hereinafter.

When the learner operates the control elements (not shown) on the tape recorder 6 to bring the tape recorder into its reproducing condition, the selector switch 1 is brought into the state shown in FIG. 3. The teaching material contained in the tape 7 is reproduced by the running of the tape 7 by way of the head 8 and the teaching material is sounded from the loudspeaker 10 by way of the change-over contacts 2, 2A of the switch 1 and the amplifier 9.

The output of the reproducing head 8 transfers the reproduced material simultaneously to the first track $T_1$ (shown in FIG. 2) of the endless type tape T by way of the recording amplifier 11 and the change-over contacts 3, 3A of the selector switch 1. When the learner imitates the teaching material he has heard from the loudspeaker 10 by speaking into the microphone 18, the imitating voice of the learner is recorded on the second track $T_2$ of the endless tape T by way of the recording amplifier 19 and the change-over contacts 15, 15A of the control switch and by the recording and reproducing head $R_2$.

Since the recording and reproducing heads $RP_1$ and $RP_2$ are accommodated in separate cases as shown in FIG. 2, the recording magnetic flux produced by the recording and reproducing head $RP_2$ does not crosstalk to the track $T_1$ of the tape T at all.

If the tape recorder is made to stop the reproducing operation at the point where the reproducing of one section of the material recorded on the tape 7 was finished, the selector switch is switched and the movable contacts 2, 3, 4, 5 are respectively switched to the 2B, 3B, 4B, 5B sides. Since the endless tape T is being driven at a constant speed during this time by the drive mechanism not shown in the drawing, the teaching material transcribed and recorded on the first track $T_1$ of the tape T by the recording and reproducing head $RP_1$ is reproduced when the tape T has traveled one round and, by way of the change-over contacts 3, 3B, 2, 2B and the amplifier 9, the voice sound is produced from the loudspeaker 10, and the learner is enabled to compare the teaching material with his imitating voice as the two sounds are produced by the loudspeaker 10 sequentially.

Further, when the learner desires to repeat the same teaching material, he is enabled to record his new imitating voice on the second track of the tape T through the microphone 18 after switching the control button 14 again to change over the contacts 15, 16, 17, to the 15A, 16A, 17A sides respectively. Although during this time the recording is made repeatedly by the recording and reproducing head $RP_2$ which is installed to face the second track $T_2$, adjacent to the teaching material recorded on the first track $T_1$ of the same tape T, crosstalk is hardly produced and noiseless reproduction of the first track $T_1$ is always made by the head $RP_1$, since the head $RP_2$ and the first track recording and reproducing head $RP_1$ are separated from each other.

As has been described so far, even when the magnetic tape T undergoes repeated recording as in the case of endless tape, the track adjacent to the recording track is quite free from the influence of the crosstalk and especially the arrangement is most effective when recording on an adjacent track while reproducing the teaching track, since there is no mingling of noise.

As mentioned above, this invention offers a magnetic head arrangement of very simple constitution which is so made as not to produce crosstalk or the howling phenomenon between two tracks, especially when the apparatus is arranged for reproducing on one track and recording on the other simultaneously. This invention is most suitable to a magnetic tape recorder especially to a learning tape recorder like the one shown in the above-mentioned embodiment which is required to record on the reproducing track information desired to be free from the mingling of noise and to reproduce the information repeatedly.

Moreover, in the above-mentioned embodiment, when a head consisting of a compound head including an erase head portion and a recording and reproducing head portion housed in the same case is used, an improved magnetic head arrangement system, which has the same volume and the same number of heads as the conventional arrangement system and which produces accurate signals, can be offered.

Other modifications of this invention, as long as they are made within the scope of the spirit of this invention, will of course be included in the scope of this invention.

In each embodiment so far, change-over means using relays are used to turn on and off the supply of signal to the heads by applying the contacts of the relays into the magnetic head circuits. However, it is also allowed to form a switching means by using semiconductor switching elements or switching circuits that have no mechanical contact.

In the said embodiment, an example is shown which operates the contacts by forming concave and convex portions on the cartridge wall corresponding to the time required for an endless type magnetic recording medium accommodated in a cartridge to make one round of travel and by operating the contacts by these concave and convex portions. It is of course allowed to pick up mechanical displacement from these concave and convex portions to adjust a variable resistor and to use this resistor as the time constant circuit element.

What is claimed is:

1. In a magnetic head system for preventing crosstalk between recording tracks formed on a movable magnetic recording medium, the improvement comprising a first magnetic head having a recording function; a first erase head; a first magnetic shielding case encompassing said first magnetic head and said erase head; means mounting said first magnetic head and said erase head to face a first recording track of the magnetic recording medium wherein said first magnetic head is disposed behind said erase head in the direction of advancing movement of the recording medium; a second magnetic head having a playback function; a second shielding case encompassing said second magnetic head; and means mounting said second magnetic head to face second recording track of the recording medium, wherein said first and second shielding cases are maintained in a fixed relationship providing a spacing therebetween as measured with respect to the direction of movement of the recording medium, and wherein said first case is disposed behind said second case with respect to said direction of movement, whereby leakage flux between said first and second magnetic heads is minimized due to said first and second shielding cases, and due to the placement of said erase head in said first shielding case with said first magnetic head, and the resultant disposition of said erase head between said first and second magnetic heads as viewed in said direction of movement.

2. A magnetic head system as set forth in claim 1, in which both of said first and second magnetic heads are record/playback magnetic heads, and further comprising a second erase head disposed within said second shielding case to face the second recording track, wherein said second magnetic head is disposed behind said second erase head with respect to the direction of advancing movement of the recording medium.

3. A magnetic head system as set forth in claim 2, further comprising a source of signals to be recorded on said first track; a loudspeaker; an erase current generator; a microphone; first switching means for actuation to a first position to couple said source of signals to said loudspeaker and to said first magnetic head for recording signals on said first track, while also connecting said erase current generator to said first erase head, and for actuation to a second position to disconnect said first erase head and to couple said loudspeaker to said first magnetic head for playing back said signals on said first track; and second switching means for actuation to a first position to couple said microphone to said second magnetic head for recording signals on said second track, while also connecting said erase current source to said second erase head, and for actuation to a second position to disconnect said second erase head and to couple said loudspeaker to said second magnetic head for playing back said signals on said second track.

* * * * *

UNITED STATES PATENT OFFICE
CERTIFICATE OF CORRECTION

Patent No. 3,710,036 Dated January 9, 1973

Inventor(s) Yutaka Kohtani

It is certified that error appears in the above-identified patent and that said Letters Patent are hereby corrected as shown below:

Column 2, line 57, the word downstream should be in quotes;
Column 3, line 8 "tected" should read --tects--;
Column 5, line 29 "$R_2$" should read --$RP_2$--; and
Column 6, line 31, after "embodiment" insert --mentioned--.

Signed and sealed this 30th day of July 1974.

(SEAL)
Attest:

McCOY M. GIBSON, JR.
Attesting Officer

C. MARSHALL DANN
Commissioner of Patents